March 5, 1935. W. E. WOODARD 1,992,980
RAILWAY VEHICLE JOURNAL BOX CONSTRUCTION
Filed July 21, 1932 6 Sheets-Sheet 3

INVENTOR
W. E. Woodard
BY
ATTORNEYS

March 5, 1935.  W. E. WOODARD  1,992,980
RAILWAY VEHICLE JOURNAL BOX CONSTRUCTION
Filed July 21, 1932  6 Sheets-Sheet 5

INVENTOR
W. E. Woodard
BY
Lynnestvedt Lechner
ATTORNEYS

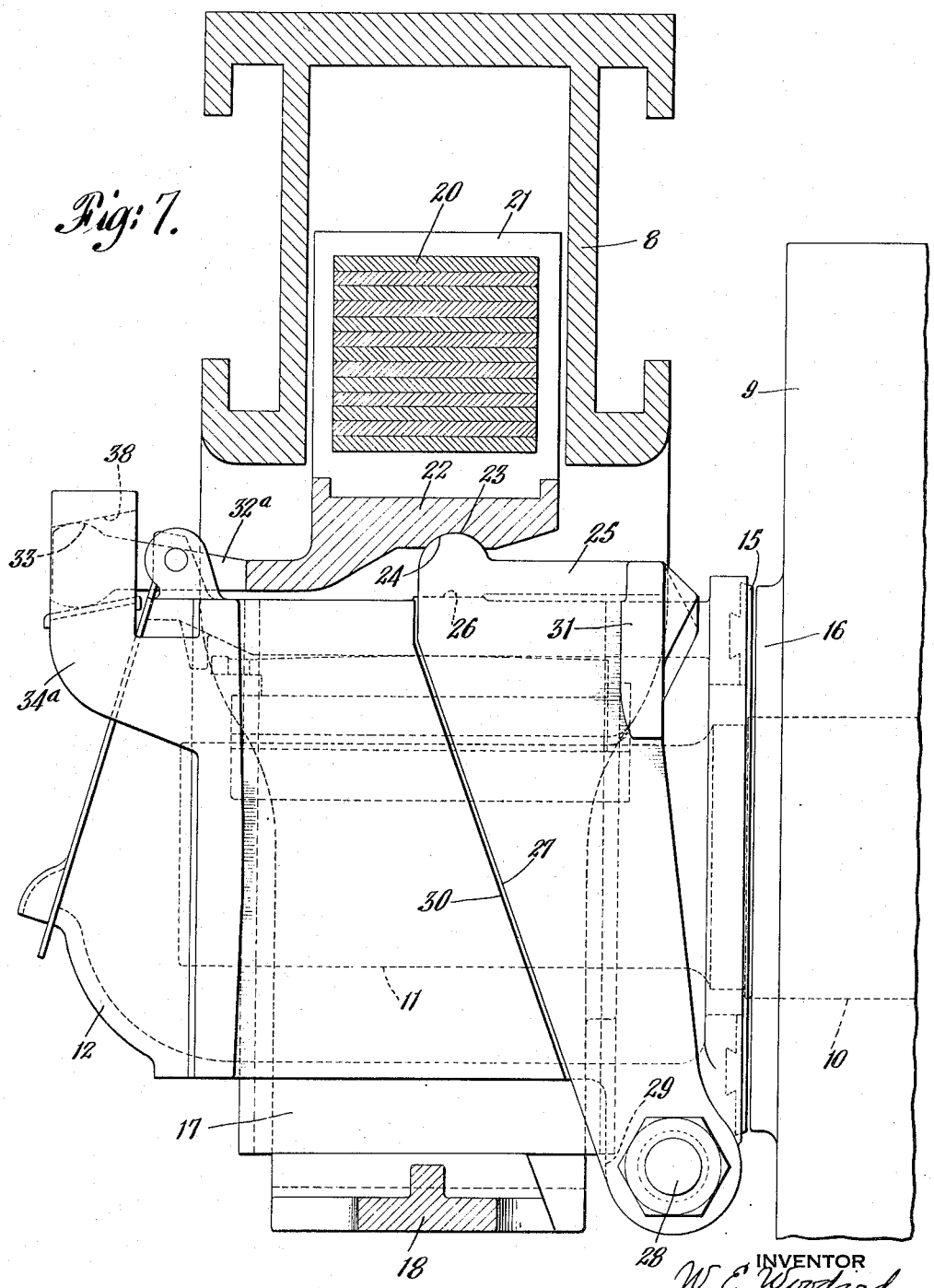

Patented Mar. 5, 1935

1,992,980

UNITED STATES PATENT OFFICE 1,992,980

RAILWAY VEHICLE JOURNAL BOX CONSTRUCTION

William E. Woodard, Forest Hills, N. Y., assignor to Franklin Railway Supply Company, New York, N. Y., a corporation of Delaware Application July 21, 1932, Serial No. 623,755

17 Claims. (Cl. 105—222)

This invention relates to railway vehicle journal boxes and particularly to boxes of this type which are mounted in the vehicle frame so as to be free to move laterally with respect thereto.

My improved construction is especially adapted for use in locomotive trailing trucks having two or more pairs of axles, although, as will be seen, it is not necessarily limited to such use.

On locomotives which have multiple axle trailing trucks or in any railway vehicle where similar conditions may be found, it is obvious that the front axle will require more lateral motion than the others in order to permit the vehicle to properly negotiate sharp curves such as are encountered at "cross-over" tracks and switch "turn-outs".

Heretofore, in vehicles requiring such excess lateral motion on one of the axles, the condition has been met by providing more than the usual amount of play between the journal boxes of the first axle and the hubs of the wheels. This practice, however, is open to the objection that an axle so journaled affords no guiding or lateral stability to the truck structure and simply acts as a carrying axle.

With the foregoing in mind my invention relates in its broader aspects to the provision of means for allowing normal lateral play between the boxes and the wheel hubs when the locomotive is on straight track, and at the same time providing for controlled excess lateral motion incident to the operation over curved sections of track.

More specifically considered, it is an object of my invention to provide a lateral motion device for the journal boxes of a railway vehicle axle which is characterized by the fact that the deflection of the box is translated into an upward movement of certain of the load transmitting parts and further by the fact that such upward movement is effected by means which maintains the said parts in substantially their normal relation to the frame of the vehicle, i. e., the construction is so arranged as to avoid undue distortion or change in location of any of the load transmitting parts of the vehicle.

It is a further object of my invention to provide leverage means at each end of the journal box for controlling its lateral motion, by means of which arrangement certain advantages can be obtained which will be more fully brought out hereinafter particularly with respect to the member upon which the load transmitting spring is adapted to rest.

Another object of the invention is to provide a device of the character described in which the tendency for the parts to become loose in service is reduced to a minimum.

How the foregoing, together with such other objects as may appear hereinafter, or are incident to my invention, are obtained, is illustrated in preferred form in the accompanying drawings, wherein—

Fig. 7 is a view similar to that shown in Fig. 3 but illustrating a slight modification.

Figure 1:
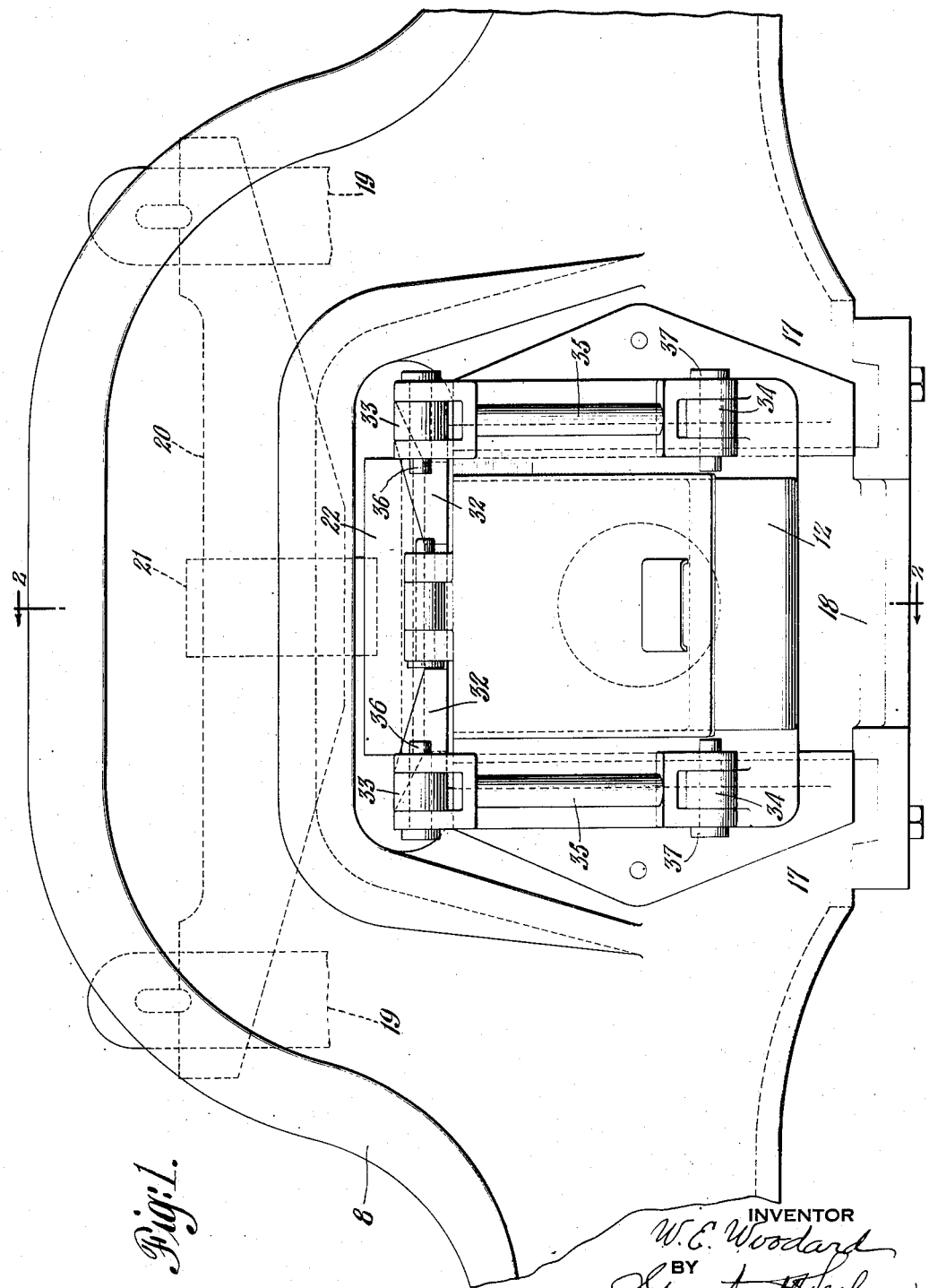
Fig. 1 is a fragmentary side elevation of a vehicle frame with a journal box mounted therein.

In the drawings, the frame 8 of the vehicle is shown to the outside of the wheel 9 on the axle 10. The journal 11 is mounted in the journal box 12 which is provided with the customary journal brass 13 and wedge 14. At its inner end the journal box 12 carries a suitable insert of bearing metal 15 which is adapted to receive the thrust of the wheel hub 16.

The frame 8 is provided with the customary pedestal jaws 17 between which is mounted the axle box 12. The usual pedestal binder 18 is secured to the under face of the jaws 17.

The weight of the vehicle is transmitted from the frame 8 through the usual spring hangers 19 and spring 20 to the top of the box 12, there being provided, however, certain additional load transmitting parts incident to my invention which will now be described.

The spring band 21 is seated upon a spring plate 22 which is provided on its bottom face with a rounded bearing groove 23 extending transversely of the box but longitudinally of the vehicle. This bearing groove 23 lies slightly to the inside of the vertical, longitudinal plane which passes through the center of the spring, as is clearly shown in such figures as 2, 3, 5 and 7. The purpose for this will appear hereinafter.

Figure 6:
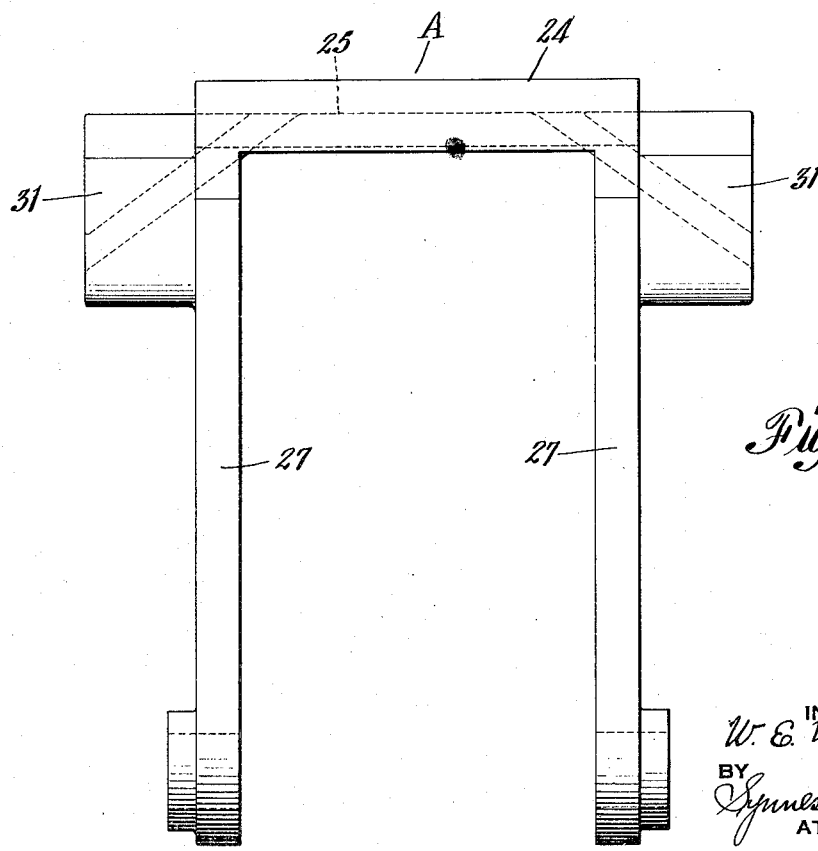
Fig. 6 is an elevation of the bell crank rocker member used with my improved construction.

The spring plate 22 rests upon the correspondingly formed ridge 24 on the horizontally extending arm 25 of the bell crank rocker member indicated as a whole by the character A and illustrated by itself in Fig. 6.

In normal position the arm 25 rests upon the pad 26 on the top of the box, said pad being located substantially on the transverse center line of the box and the journal. The other arm of the bell crank rocker member A takes the form of a pair of downwardly extending arms 27, the lower ends of which are pivoted by means of a suitable pin or bolt 28 to downwardly extending lugs 29 at the lower inner corners of the box. As will be seen upon inspection of the drawings the pivot pin 28 lies between the wheel 9 and the pedestal jaws 17 of the frame 8.

It will, therefore, be seen that the bell crank rocking member A has its vertically extending arm in the form of a U-shaped member which straddles the box, the box being formed with a corresponding recess 30 for the accommodation of the extensions 27. The adjacent outer faces of the box and of the members 27 are flush so that they form a straight face adapted to take against the inner wall of the pedestal jaw.

At the elbow of the bell crank, at each side thereof, is a lateral extension 31 which extends fore and aft of the vehicle in position to abut against the inner side of the pedestal jaws 17 of the frame 8.

The outer edge or side of the spring plate 22 is provided at each corner with an extended arm 32 having a terminal hub or lug portion 33. Below each of these arms 32 the journal box 12 is provided with an outwardly extended lug 34, and a link or rod 35 connects the hub 33 of each arm 32 with the corresponding lug 34. Suitable pins 36 and 37 are provided for making the connections.

It will be noticed that the pivot pin 28 is located well below the plane of the journal and that the pivot pins 37 are located approximately in the plane of the bottom of the journal so that all of these pivot points for the members which control the upward movement of the plate 22 lie in a plane which is well below the axis of the journal.

Figure 2:
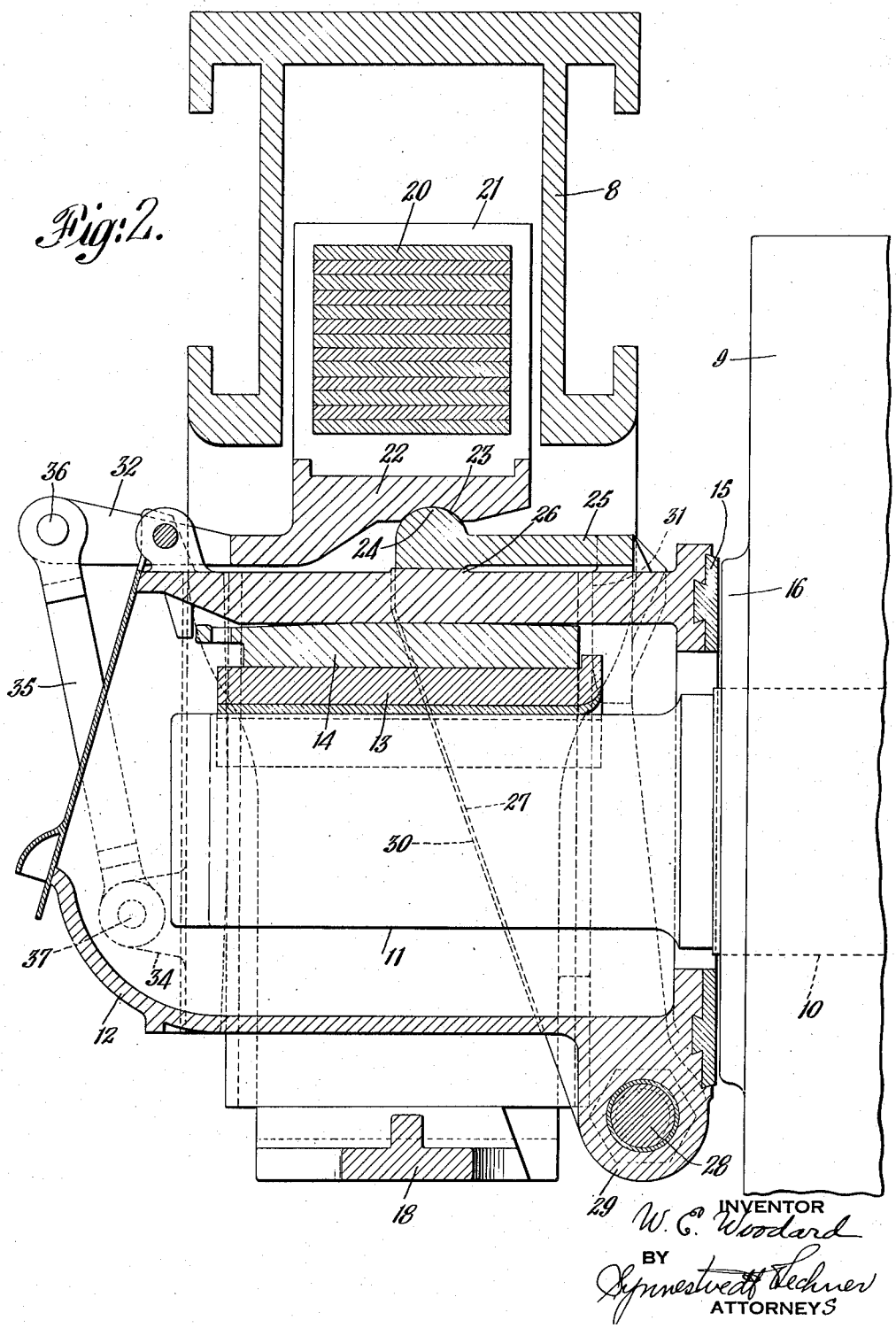
Fig. 2 is a section on the line 2—2 of Fig. 1 with the parts in their normal position.
Figure 3:
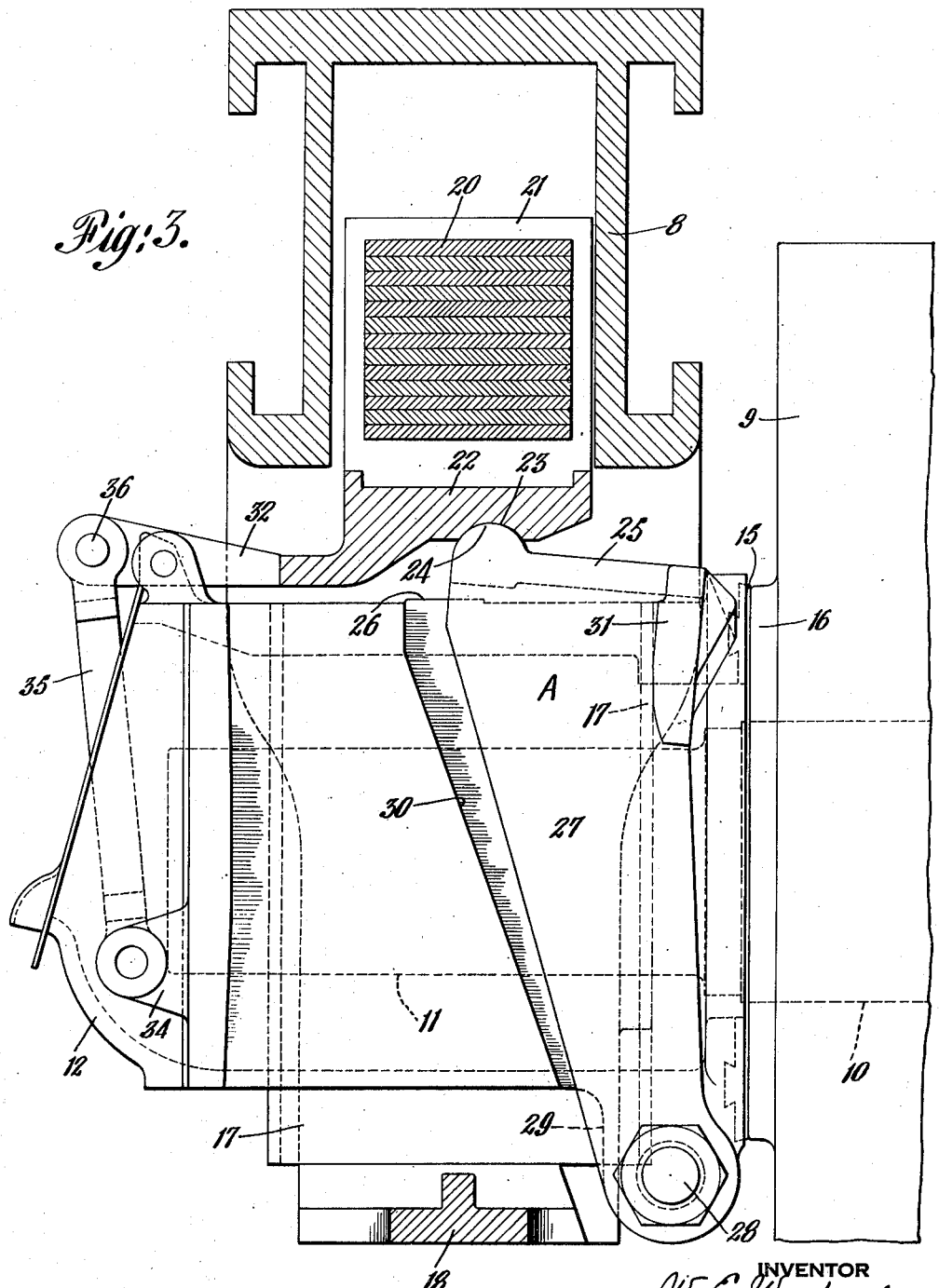
Fig. 3 is a view similar to Fig. 2, except that the axle journal box is shown in side elevation and with the parts in the positions they would occupy at the extreme degree of lateral motion.
Figure 4:
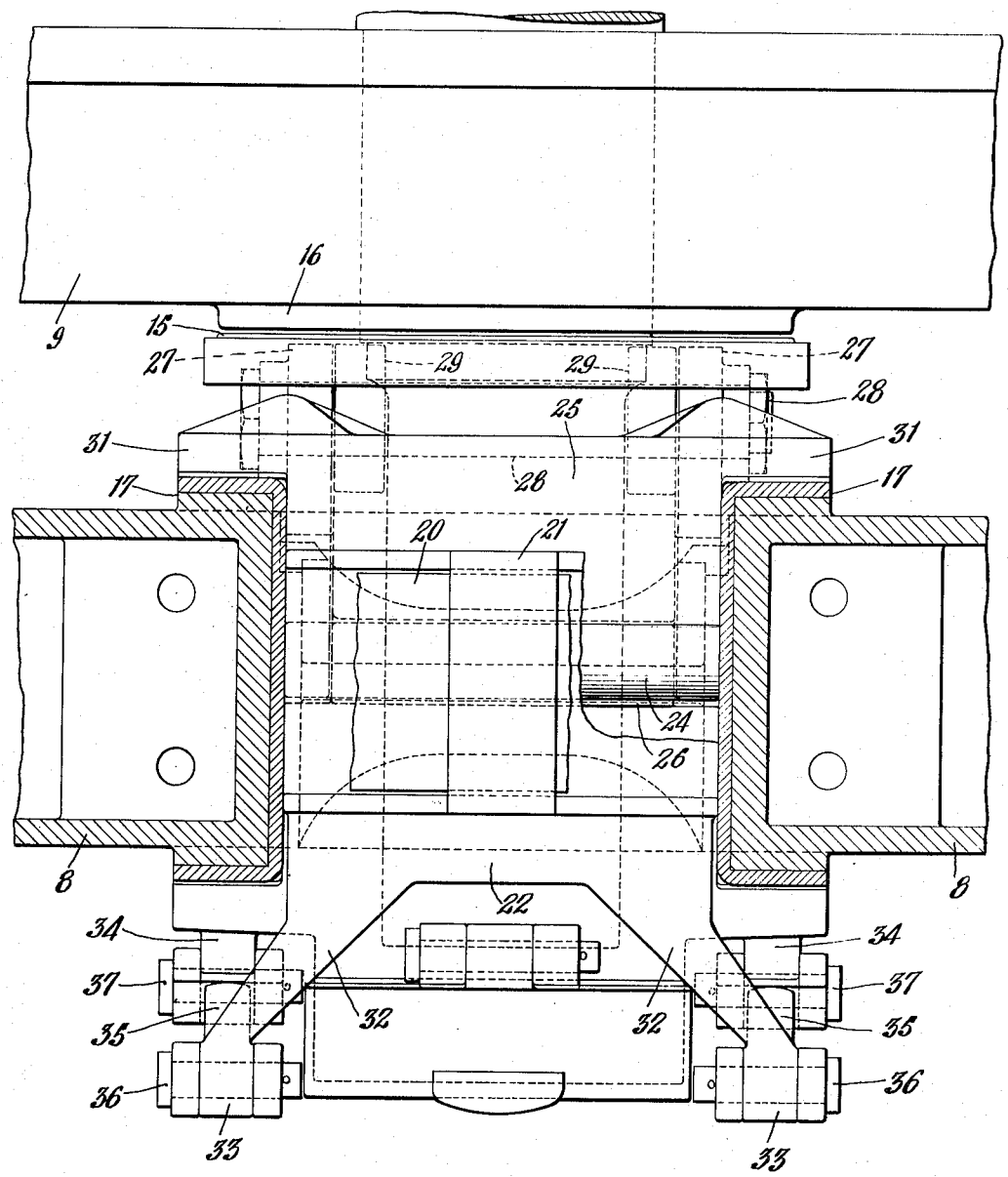
Fig. 4 is a partial plan and horizontal sectional view of the improved structure shown in Figs. 1, 2 and 3.
Figure 5:
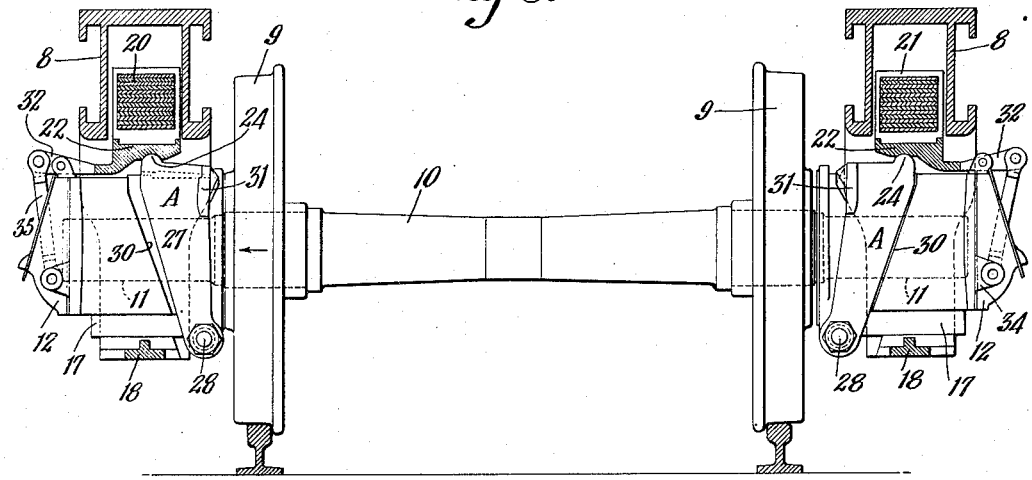
Fig. 5 is a partial transverse section through the vehicle with the axle wheels and journal boxes shown in elevation.

The operation of the device is as follows, particular reference being had to Figs. 2, 3, and 5. Suppose the vehicle is taking a curve which causes the axle 10 with its wheels 9 to move toward the left with relation to the frame 8. The hub 16 of the wheel 9 at the left hand end of the axle will abut against the bearing 15 on the driving box 12 and force the driving box outwardly with respect to the frame 8. Inasmuch as the lugs 31 are substantially in contact with the pedestal jaws 17 in normal position of the box, this will immediately cause a rocking movement of the member A such as will result in raising the arm 25 and consequently the spring plate 22 against the load which is transmitted through the spring. The parts will then move from the position shown in Fig. 2 to the position shown in Fig. 3. The lateral motion, therefore, is gravity controlled because the weight of the load will always tend to return the box to its normal position by virtue of the downward and inward lateral thrust upon the box 12.

As the box moves outwardly in the manner just described the connecting links 35 will be moves more nearly to a straight up and down or vertical position. This, of course, will result in a corresponding lifting of the outer edge of the spring plate 22 and the parts are so proportioned and calculated as to substantially compensate for the lift caused by the arm 25 as just described.

It is obvious, therefore, that there will be practically no distortion of any of the load transmitting parts and that the spring plate 22 will remain in substantially level or horizontal position during the entire time that deflection of the box occurs. There will, of course, be a slight movement of the spring 20 from its central position illustrated in Fig. 2 to the deflected position shown in Fig. 3, but this is negligible for all practical purposes and no serious harm will result therefrom. The plate 22, however, as stated, remains substantially level throughout such deflection so that there will be practically no distortion of any of the load transmitting parts.

It will, of course, be understood that the foregoing description of the operation of the device refers to the parts at the left hand end of the axle. At the other or right hand end the journal of the axle will simply slide through its journal brass, the box at this end being held against inner movement by contact of the outer flanges of the box with the pedestal jaws 17 of the frame 8. In lateral motion in the opposite direction the operation will be reversed as will be fully appreciated from the drawings.

As previously described the point of support for the plate 22 is slightly to the inside of the longitudinal center of the spring so that a small proportion at least of the load will be transmitted to the box through the arms 32, rods 35 and lugs 34, although the major portion of the load will be transmitted directly to the pad 26. The purpose of this arrangement is to keep the parts which connect the lugs 32 on the spring plate 22 with the lugs 34 on the box always in tight condition so that there will be little tendency to wear or rattle as would otherwise occur were these parts to carry no weight at all. However, during normal running when neither box is deflected (which condition exists, of course, throughout a great proportion of the time) the load from spring 20 is transmitted through the plate 22 and arm 25 of the rocker A to the pillow or seat 26 which is substantially on the transverse center line of the journal box and its journal 11. This arrangement, as will be fully appreciated, is the best for practical operating conditions. Furthermore, when in deflected position, the construction is such that substantially all of the load is supported by the arm 25 of the lever means A.

In the modification of Fig. 7 the structure, insofar as the bell crank rocking member A is concerned, is identical with the structure of the other figures. The only difference in Fig. 7 resides in the connection between the outer side of the plate 22 and the outer end of the box. In Fig. 7 the upper outer corner at each side of the box is provided with an upstanding lug 34a having an upwardly and inwardly inclined hole 38. The plate 22 is provided with arms 32a the ends of which are rounded as at 33a, such rounded ends fitting snugly in the hole 38. With this arrangement, when the box 12 moves outwardly, it will be obvious that the rounded ends 33a will be moved upwardly in the holes 38, thereby raising the outer side of the plate 22 to compensate for the lift given by the arm 25 of the rocking member A.

I claim:—

1. In a railway vehicle, the combination of a vehicle frame having pedestal jaws, an axle having a wheel and a journal, a journal box mounted for lateral movement in said jaws, a spring, a spring plate, and lever means at each end of the box for lifting the spring plate upon lateral motion of the box.

2. In a railway vehicle having an axle journal box mounted for lateral motion in the frame of the vehicle, the combination of means for transmitting the load to the journal which includes a plate above the box, and a bell crank lever with an arm between the box and the plate mounted so as to raise the plate against the load upon lateral movement of the box, together with means reacting between the plate and the box to keep the plate substantially level in all positions of the box.

3. In a railway vehicle, the combination of a frame, an axle having a wheel and a journal, a journal box mounted for lateral movement in the frame, means for transmitting the vehicle load to the journal box, a bell crank lever member having one arm pivoted to the box and the other arm extending between the load transmitting means and the box, means on said member adapted to engage the frame upon lateral movement of the box whereby to cause said member to rock on its pivoted arm and raise the other arm to lift the load transmitting means, that a compensating connecting means between the box and the load transmitting means whereby to maintain the latter substantially level during lateral displacement of the box.

4. In a railway vehicle, the combination of a vehicle frame, an axle having a wheel and a journal, a journal box mounted in said frame for lateral movement, means for transmitting vehicle load to said box, and a means at each end of the box which, upon lateral displacement of the box, operates to raise the load transmitting means while still maintaining it in substantially normal level position.

5. In a railway vehicle, the combination of a frame, an axle journal, a journal box mounted for lateral movement in the frame, a load transmitting spring, a plate carrying said spring, a rocker member having an arm between the plate and the box, said arm normally receiving and transmitting the major portion of the load to said box, said rocker having a second arm pivoted on the box and also a lug adapted to contact with the frame to raise said plate upon lateral movement of the box, and means for maintaining the plate in substantially level position during such lateral motion.

6. In a railway vehicle, the combination of an axle having a wheel and a journal to the outside of the wheel, a vehicle frame, a journal box mounted for lateral motion in the frame, load transmitting means, a bell-crank rocker member having an arm pivoted on the journal box at a point between the wheel and the frame, a second arm on the rocker member interposed between the load transmitting means and the journal box in position to receive the load approximately on the transverse centre line of the box, and means on the rocker for engaging the frame so as to cause said second arm to move upwardly against the load during lateral movement of the journal box, the load so raised tending under the effect of gravity to return the rocker and the box to normal position.

7. In a railway vehicle, the combination of a journal box capable of lateral motion, a spring, a spring supporting plate, lever means pivoted on the box having a portion extended between the box and said plate, said lever means being inactive in normal position of the box but adapted upon lateral motion of the box to support substantially all of the spring load which is transmitted to said plate, and means for maintaining substantially constant the relation of the plate laterally of the vehicle frame in all positions of the lever means.

8. In a railway vehicle, the combination of a vehicle frame having pedestal jaws, an axle having a wheel and a journal, a journal box mounted for lateral movement in said jaws, a spring adapted to be carried on the box, and lever means at each end of the box for raising the spring upon lateral motion of the box.

9. A journal box for a railway vehicle carrying a lateral motion centering rocker having an arm extending over the top thereof in position to receive vehicle load and having the other arm in the form of a U shaped member straddling the box with the legs of the U pivoted to the box at a point below the axis of the journal.

10. A journal box for a railway vehicle carrying a lateral motion centering rocker having an arm extending over the top thereof in position to receive vehicle load and having the other arm in the form of a U shaped member straddling the box with the legs of the U pivoted to the box at a point below the axis of the journal, said box being recessed at each side to receive the legs of the U and each side of the box together with the cooperating leg of the U presenting a flat face toward the adjacent pedestal jaw.

11. In a railway vehicle having a frame, the combination of a journal box mounted in said frame with freedom for lateral motion, and a lateral motion centering lever having a pair of arms one of which is pivoted on the box at a point below the axis of the journal and the other of which is extended over the top of the box in position to receive the load approximately on the transverse center line of the box.

12. In a railway vehicle having a frame, the combination of a journal box mounted in said frame with freedom for lateral motion, a spring, and a lateral motion centering lever having a pair of arms one of which is pivoted on the box at a point below the axis of the journal and the other of which is extended over the top of the box under the spring in position to receive the load approximately on the transverse center line of the box.

13. In a railway vehicle having a frame, the combination of a journal box mounted in the frame with freedom for lateral motion, means for transmitting the vehicle load from the frame to the box, a lateral motion centering lever having a pair of arms one of which is pivoted on the box and the other of which is extended over the top of the box to receive the load from said load transmitting means, and an abutment on said lever adapted to react against the frame upon lateral motion of the box in order to raise the arm of the lever which receives the load.

14. In a railway vehicle having a frame, the combination of a journal box mounted in the frame with freedom for lateral motion, means for transmitting the vehicle load from the frame to the box, a lateral motion centering lever having a pair of arms one of which is pivoted on the box and the other of which is extended over the top of the box to receive the load from said load transmitting means and means for rocking said lever on its box pivot upon lateral motion of the box in order to raise the arm which receives the load.

15. In a railway vehicle having a frame, the combination of a journal box mounted in the frame with freedom for lateral motion, means for transmitting the vehicle load from the frame to the box, a lateral motion centering lever having a pair of arms one of which is pivoted on the box at a point below the top thereof and the other of which is extended over the top of the box to receive the load from said load transmitting means, and an abutment on said lever above its box pivot which abutment is adapted to react against the frame upon lateral motion of the box in order to raise the arm of the lever which receives the load.

16. In a railway vehicle having a frame, the combination of a journal box mounted in the frame with freedom for lateral motion, means for transmitting the vehicle load from the frame to the box, a lateral motion centering lever having a pair of arms one of which is pivoted on the box at a point below the top thereof and the other of which is extended over the top of the box to receive the load from said load transmitting means, and means reacting against the frame for rocking said lever on its box pivot upon lateral motion of the box in order to raise the arm which receives the load.

17. In a railway vehicle having a frame, the combination of a journal box mounted in the frame with freedom for lateral motion, means for transmitting the vehicle load from the frame to the box, a lateral motion centering lever having a pair of arms one of which is pivoted on the box and the other of which is extended over the top of the box to receive the load from said load transmitting means, an abutment on said lever adapted to react against the frame upon lateral motion of the box in order to raise the arm of the lever which receives the load and a compensating connecting means between the box and the load transmitting means whereby to maintain the latter substantially level during lateral motion of the box.

WILLIAM E. WOODARD.

CERTIFICATE OF CORRECTION.

Patent No. 1,992,980.  March 5, 1935.

WILLIAM E. WOODARD.

It is hereby certified that error appears in the printed specification of the above numbered patent requiring correction as follows: Page 3, first column, line 27, claim 3, for "that" read and; and that the said Letters Patent should be read with this correction therein that the same may conform to the record of the case in the Patent Office.

Signed and sealed this 9th day of April, A. D. 1935.

Leslie Frazer (Seal)

Acting Commissioner of Patents.